United States Patent [19]
Stein

[11] Patent Number: 6,046,602
[45] Date of Patent: Apr. 4, 2000

[54] METHOD FOR DETERMINING THE STATE OF STRENGTH OF WINDING OVERHANGS OF ELECTRIC MACHINES, AND ARRANGEMENT FOR CARRYING OUT THE METHOD

[75] Inventor: Rüdiger Stein, Birr, Switzerland

[73] Assignee: Asea Brown Boveri AG, Baden, Switzerland

[21] Appl. No.: 08/986,142

[22] Filed: Dec. 5, 1997

[30] Foreign Application Priority Data

Feb. 17, 1997 [DE] Germany ............... 197 05 922

[51] Int. Cl.$^7$ ................................. G01R 31/34
[52] U.S. Cl. .................. 324/772; 324/545; 73/660
[58] Field of Search ................... 324/772, 537, 324/545; 73/1.85, 660, 661, 655, 653, 654; 364/551.01, 550, 508

[56] References Cited

U.S. PATENT DOCUMENTS

| | | | |
|---|---|---|---|
| 4,321,464 | 3/1982 | Miller | 73/655 |
| 5,469,745 | 11/1995 | Twerdochlib | 73/655 X |
| 5,675,497 | 10/1997 | Petsche et al. | 364/485 |
| 5,684,718 | 11/1997 | Jenkins et al. | 73/660 X |

FOREIGN PATENT DOCUMENTS

| | | |
|---|---|---|
| 0627616A2 | 12/1994 | European Pat. Off. . |
| 3725123A1 | 4/1988 | Germany . |
| 4028522C2 | 3/1992 | Germany . |
| 4234852C2 | 4/1994 | Germany . |

OTHER PUBLICATIONS

"On–Line Vibration Monitoring of End Windings by Means of a Fiber–Optic Accelerometric System", Mariottini, et al., Utility Motor and Generator Predictive Maintenance and Refurbishment, Nov. 1995.

"Modern Monitoring Used for Life Management of Generators", Huber, et al.

"Modern Monitoring used for Life Management of Generators", Albert Huber, Albert Kopp, ABB Power Generation Ltd., Conference Proceedings, "Electron", SAIEE–Journal, Sep. 1993.

*Primary Examiner*—Josie Ballato
*Assistant Examiner*—T. R. Sundaram
*Attorney, Agent, or Firm*—Burns, Doane, Swecker & Mathis, L.L.P.

[57] ABSTRACT

In a method for determining the state of strength of winding overhangs (2) of electric machines, at least one sensor (3), which is arranged on a winding end (4) of a winding overhang (2) and is connected to an evaluation unit (5) is used to determine a vibration amplitude (A) of the winding end (4), and the associated phase ($\phi$). The phase ($\phi$) of the vibration amplitude (A) is determined in this case with reference to a phase of an electric current flowing through the winding end (4). The quotient ($\Delta A$) of the vibration amplitude (A) and an amplitude reference ($A_{ref}$) dependent on the electric current, and the quotient ($\Delta\phi$) of the phase ($\phi$) of the vibration amplitude (A) and a phase reference ($\phi_{ref}$) dependent on the temperature of the winding overhang (2) permit the state of strength of winding overhangs to be determined and causes to be located in the event of a change in the vibration amplitude.

6 Claims, 1 Drawing Sheet

METHOD FOR DETERMINING THE STATE OF STRENGTH OF WINDING OVERHANGS OF ELECTRIC MACHINES, AND ARRANGEMENT FOR CARRYING OUT THE METHOD

BACKGROUND OF THE INVENTION

1. Field of the invention

The invention relates to a method for determining the state of strength of winding overhangs of electric machines. The invention also relates to an arrangement for carrying out this method.

2. Discussion of Background

In electric machines, in particular generators having an output of more than 200 MVA, the winding overhang, that is to say the part of the winding which projects on both sides beyond the laminated core, must be configured such that it withstands the magnetic forces occurring during operation. These forces can assume a substantial magnitude in the case of a short circuit, and thus constitute a remarkable potential risk for the entire machine.

It is always possible in principle that the required mechanical pretensioning of the winding overhang assembly will decrease after a few years of operation. This is all the more probable the more short circuits a generator has undergone, for example. However, changes in the mechanical properties of the winding overhang assembly can also occur in the case of generators which are exposed to frequent load changes and the temperature fluctuations associated therewith.

A measured variable which is also influenced during operation by, inter alia, the mechanical properties of the winding overhang assembly is the winding overhang vibration, which can be measured locally in radial, tangential and axial directions using acceleration pickups. It is known to use the vibration accelerations measured at different points on the winding overhang circumference to determine the local vibration deflections or vibration amplitudes by twofold integration, and to monitor these parameters for limiting values. In this case, it is normally only the double line-frequency components of the winding overhang vibration which are considered. In normal operation, said winding overhang vibration is essentially excited by the symmetrical current system in the stator winding and, depending on the type of design of the winding overhang brackets, more or less also by the vibration of the stator laminated body.

Vibration monitoring proceeding according to this principle is known, for example, from "Modern Monitoring used in Life Management of Generator", Conference Proceedings September 1993, "Elektron" SAIEE-Journal. It is proposed herein to refer the vibration amplitude and its phase to a wave reference signal for each measuring optical sensor. A problem with this type of monitoring is assigning an increased deflection of the winding overhang vibration to the concrete cause, that is to say it is not possible to establish whether the excitation has increased or decreased, or whether the winding overhang assembly has become softer or harder, in terms of vibration.

SUMMARY OF THE INVENTION

Accordingly, one object of the invention is to provide a novel method for determining the state of strength of winding overhangs of electric machines which permits the concrete cause of a change in the winding overhang vibrations to be specified. An arrangement for carrying out the method according to the invention is also to be demonstrated.

The advantages of the invention are to be seen, inter alia, in the fact that locating the causes for the vibrations of the winding overhang is permitted by referring the phase of the vibration amplitude to the phase of the electric current flowing through the winding end.

In a particularly preferred embodiment of the invention, it is provided that three optical acceleration pickups on winding ends are arranged distributed uniformly on the circumference of a winding overhang, and that in this case at least one acceleration pickup is aligned in the tangential effective direction, and at least one acceleration pickup is aligned in the radial effective direction.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the sole FIGURE shows a simplified view of a stator winding overhang of an electric machine having an arrangement for carrying out the method according to the invention.

Only elements essential for understanding the invention are shown.

DESCRIPTION OF THE PREFERRED EMBODIMENTS

Figure 1:
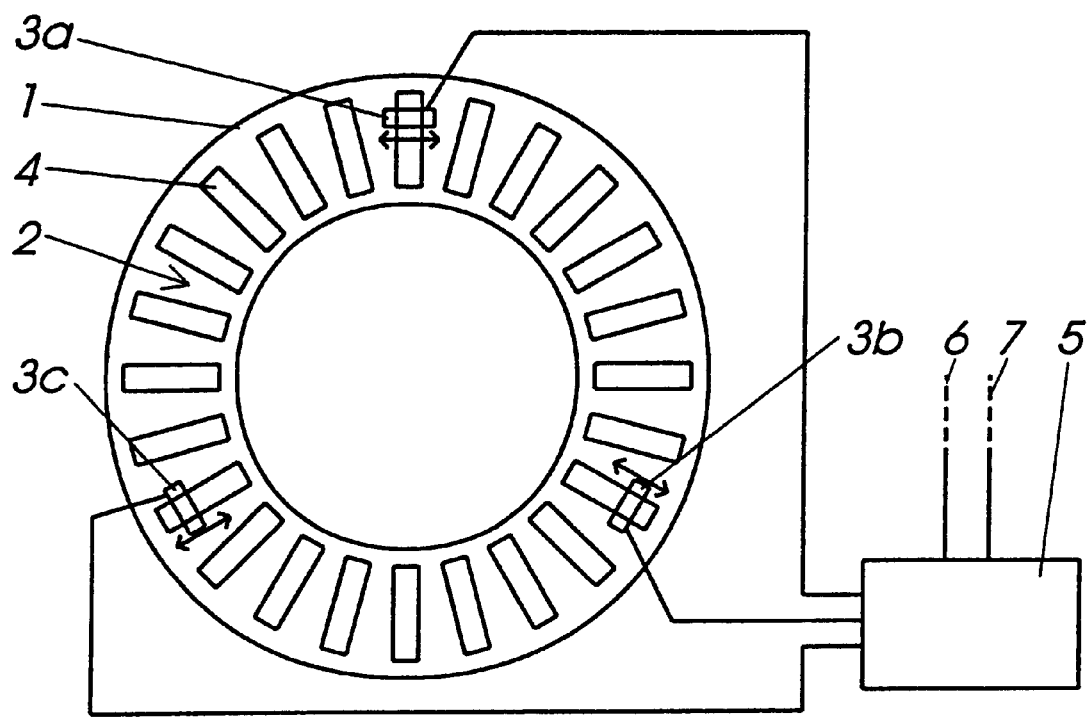

Referring now to the drawing, in the sole FIGURE 2 denotes a winding overhang of an electric machine, for example a generator, and 4 denotes winding ends, which in their entirety make up the winding overhang 2. The winding overhang is surrounded by a machine housing 1. Distributed uniformly over the circumference of the winding overhang are three optical acceleration pickups 3a, b, c, two of the acceleration pickups 3b, c being aligned in the radial effective direction, and one acceleration pickup 3a being aligned in the tangential effective direction. In selecting the installation site, preference is given to those winding ends 4 for which the largest deflections are expected, with the condition that one acceleration pickup 3a, b, c in each case is arranged in each phase U, V, W of the generator winding. The optical acceleration pickups 3a, b, c are connected to an evaluation unit 5. Via a measuring line 6, which is connected to current-measuring points (not represented), the evaluation unit 5 is fed measured current values $I_u$, $I_v$, $I_w$ of the generator phases. A measuring line 7, which is connected to temperature sensors (not represented) near the measuring points of the acceleration pickups, transmits corresponding measured temperature values T to the evaluation unit 5.

The optical acceleration pickups 3a, b, c detect the vibration acceleration at the winding ends 4 of the generator, which is in operation. There are in principle three mechanisms which influence the vibration deflection of the winding ends 4:

the stator current of fundamental frequency 50 Hz (or 60 Hz for the USA) leads to double-frequency forces between the conductors in the winding overhang; vibrations are excited by force in this case;

the magnetic flux density of fundamental frequency 50 Hz in the generator stator (or 60 Hz for the USA) leads to double-frequency laminated core vibrations which, depending on the mechanical coupling between the laminated core and winding overhang, excite the latter to vibrate; these vibration influences are therefore based on a path excitation;

finally, a shift in the natural frequency can influence the amplitude of the vibration deflection without there having been a change in excitation, this mechanism therefore being denoted for short as natural-frequency variation.

The measured values generated by the acceleration pickups 3a, b, c are converted in the evaluation unit 5 by a Fourier transformation and subsequent twofold integration to form a deflection or amplitude signal A of the vibrations. Furthermore, the phases φ of the vibration amplitudes are determined with reference to the phase of a generator stator current $I_u$ or $I_v$, $I_w$. For this purpose, the evaluation unit 5 comprises essentially a measured-value acquisition and conditioning system for the acceleration pickups 3a, b, c, a measured-value acquisition and conditioning system for the generator stator currents $I_u$, $I_v$, $I_w$, a measured-value acquisition and conditioning system for the temperatures at the measuring points of the acceleration pickups, and a computer unit.

As follows from the mechanisms described above, which are essential for the vibration deflection, it is chiefly the double-frequency components of the vibration deflection A and the associated phase φ which are of interest, that is to say the 100 Hz (120 Hz) components. To determine the state of strength of the winding overhang 2, the ratios are formed of the obtained values for the vibration deflection A and the phase φ to corresponding reference values $A_{ref}$ and $\phi_{ref}$. The following model is the basis for reference values $A_{ref}$ and $\phi_{ref}$:

Since the stator current is the determining variable with reference to the vibration excitations, and the square of the current features in the resulting force, it holds for the reference value calculation $A_{ref}$ of the vibration amplitude that:

$$A_{ref} = w_0 + w_1 \cdot I + w_2 \cdot I^2$$

This equation is used to determine the reference values $A_{ref}$ for each operating point of the respective phase current $I_u$, $I_v$, $I_w$, the constants $w_0$, $w_1$, $w_2$ having been determined, for example, during the commissioning of the generator in so-called "fingerprint measurements" of the vibrations at different load points of the generator. The equation for the reference values $A_{ref}$ covers both the force excitation by the stator current I ($w_1$, $w_2$), and the path excitation by the laminated core vibrations ($w_0$).

The reference values $\phi_{ref}$ are determined as follows for the phase; it is decisive in this case that the phase shift between the vibration deflection and the periodically excited force can vary as a consequence of the current (force excitation) only at the natural frequency of the winding overhang 2. The model for the phase reference $\phi_{ref}$ essentially takes account of the influence of the load-induced heating of the measuring points to the natural frequency of the winding overhang. In the region under consideration between idling, that is to say a machine under no load and thus cold, and full load, the variation or change in natural frequency and the change in phase are combined linearly with the temperature T. It therefore holds for the reference values of the phase that:

$$\phi_{ref} = p_0 + p_1 \cdot T$$

The reference values $\phi_{ref}$ are determined for each operating point by means of this equation, as well, the constants $p_0$ and $p_1$ having been determined, for example, during commissioning of the generator in so-called "fingerprint measurements" of the vibrations at different load points of the generator.

The measured vibration amplitudes A and the associated phases φ are now acquired during the operation of the generator. The state of strength of the winding overhang is then determined as follows from the relationships $$\Delta A = \frac{A - A_{ref}}{A}$$

and $$\Delta \varphi = \frac{\varphi - \varphi_{ref}}{\varphi} :$$

1. If a larger vibration amplitude is observed for a changed generator load and ΔA remains 0, there is a normal current-induced increase in vibration.
2. If a larger vibration amplitude is observed for a changed generator load and ΔA is larger than 0, there is no current-induced increase in vibration.
3. If, in this case, Δφ assumes a value not equal to 0, this indicates a loosening of the winding overhang, assuming that the value φ has changed in the same direction as in the case of a temperature-induced natural-frequency shift toward the resonance state of the winding overhang. The phase φ can in this case assume values between 0° and 360°. It is assumed here that there are no changes in the cooling conditions. Such changes in the cooling conditions can occur, for example, if there is a change in the cold gas temperature in the generator.

Applying the method described renders it possible for the first time for generators, which must have a high degree of availability, to supply while in operation information on the state of system components, such as winding overhang brackets, which are affected by wear. As a result, generally time-dependent planning of maintenance intervals can gradually be transformed into state-dependent planning. Longer operating intervals and avoidable down-times in the case of necessary acquisition of spare parts increase the availability of a generator. By contrast with a conventional monitoring of limiting values, changes in the state of the system can be recognized by means of the described diagnosis of causes before critical values of vibration amplitudes are reached.

It is conceivable within the purpose of the invention for the method and the arrangement for carrying out the method to be used simultaneously on the winding overhangs on both sides of the generator, that is to say at the drive end and at the nondrive end. Of course, it is also possible here to use nonoptical acceleration pickups which, in addition, can also be arranged in the axial effective direction.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining a state of strength of winding overhangs in an electric machine, the electric machine comprising at least one vibration sensor arranged on a winding end of a winding overhang of the electric machine and connected to an evaluation unit used to detect a vibration of the winding end based on an output of the at least one vibration sensor, and a stator, the method comprising the steps of:

determining a vibration amplitude reference that is dependent on at least one phase current in the stator;

comparing an amplitude of vibration of the winding end indicated by the evaluation unit with the vibration amplitude reference;

determining a phase reference that is dependent on a temperature of the electric machine;

comparing a phase between the vibration detected by the evaluation unit and the at least one phase current with the phase reference; and determining a mechanical condition of the winding overhang based on the amplitude and phase comparisons.

2. The method of claim 1, wherein the vibration amplitude reference is defined as $$A_{ref} = w_0 + (w_1 \cdot I) + (w_2 \cdot I^2)$$

where $w_0$, $w_1$, $w_2$ are predetermined constants corresponding to different load points of the electric machine, and I is each of phase currents $I_u$, $I_v$, $I_w$; and the phase reference is defined as $$\Phi_{ref} = p_0 + p_1 \cdot T$$

where $p_0$ and $p_1$ are predetermined constants, and

T is a temperature of the winding overhang.

3. The method of claim 1, wherein the determination indicates that the winding overhang is loose when a) a difference between the amplitude of vibration of the winding end and the amplitude vibration reference is greater than zero, and b) a difference between the phase between the vibration detected by the evaluation unit and the at least one phase current and the phase reference is not equal to zero.

4. The method of claim 1, wherein:

the at least one vibration sensor comprises three sensors arranged on winding ends of the winding overhang in a uniform distribution on the circumference of the winding overhang;

each of the three sensors is constructed from optical acceleration pickups;

at least one of the three sensors measures acceleration in a direction tangential to the winding end on which it is arranged; and at least one of the three sensors measures acceleration in a direction radial to the winding end on which it is arranged.

5. The method of claim 4, wherein the evaluation unit comprises:

a measured-value acquisition and conditioning system for the at least one vibration sensor;

a measured-value acquisition and conditioning system for stator currents of the electric machine; and a computer unit.

6. The method of claim 1, wherein the electric machine is a generator.

* * * * *